(12) United States Patent
Wang

(10) Patent No.: US 8,645,831 B2
(45) Date of Patent: Feb. 4, 2014

(54) TRANSLATING USER INPUT IN A USER INTERFACE

(75) Inventor: Kang Yu Wang, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 970 days.

(21) Appl. No.: 12/167,307

(22) Filed: Jul. 3, 2008

(65) Prior Publication Data

US 2010/0005392 A1    Jan. 7, 2010

(51) Int. Cl.
*G06F 3/00*        (2006.01)
(52) U.S. Cl.
USPC .......................................... 715/716; 345/168
(58) Field of Classification Search
USPC ................. 715/716, 719, 711, 773, 856, 754; 345/156–184
See application file for complete search history.

(56) References Cited

U.S. PATENT DOCUMENTS

| | | | |
|---|---|---|---|
| 6,157,377 A * | 12/2000 | Shah-Nazaroff et al. | 715/719 |
| 6,388,657 B1 * | 5/2002 | Natoli | 345/168 |
| 6,600,480 B2 * | 7/2003 | Natoli | 345/168 |
| 7,002,553 B2 * | 2/2006 | Shkolnikov | 345/169 |
| 7,030,863 B2 * | 4/2006 | Longe et al. | 345/173 |
| 7,620,900 B2 * | 11/2009 | Kawashima et al. | 715/754 |
| 2002/0130844 A1 * | 9/2002 | Natoli | 345/168 |
| 2006/0132447 A1 * | 6/2006 | Conrad | 345/168 |
| 2006/0274051 A1 * | 12/2006 | Longe et al. | 345/173 |
| 2008/0034330 A1 * | 2/2008 | Kurita | 715/856 |
| 2008/0074385 A1 * | 3/2008 | Jouanet et al. | 345/156 |
| 2009/0012935 A1 * | 1/2009 | Beged-Dov et al. | 707/3 |
| 2009/0089676 A1 * | 4/2009 | Finkelstein et al. | 715/719 |
| 2009/0146961 A1 * | 6/2009 | Cheung et al. | 345/172 |

\* cited by examiner

*Primary Examiner* — William Titcomb
(74) *Attorney, Agent, or Firm* — McClure, Qualey & Rodack, LLP

(57) ABSTRACT

Systems and methods for translating user input in a high definition video playback system are disclosed. A disc viewer is configured to execute at least one user interactive program stored on a high definition optical disc defining a user interface. The user interactive program defines a user interface and a plurality of keyboard event handlers for interaction with the user interface. The user interface includes a plurality of selectable user interface elements. A user interface renderer is configured to encode for display the user interface. A non-keyboard input translator is configured to receive a non-keyboard user input translates it into at least one keyboard event.

24 Claims, 10 Drawing Sheets

TRANSLATING USER INPUT IN A USER INTERFACE

TECHNICAL FIELD

The present disclosure generally relates to translating user input in a user interface displayed in a high definition video playback system.

BACKGROUND

There are a variety of standards governing the format and/or other attributes of high definition video. Blu-ray Disc (BD) is a popular optical disc storage media format that is employed for high definition video and data storage. Blu-ray Disc Java (BD-J) is a development platform that allows content authors to create and incorporate interactive functionality into a Blu-ray Disc. For example, a content author can incorporate in a user interactive program on a Blu-ray Disc various user interactive menus, games, and other functionality that can be supported by the BD-J specification. A content author may also choose to support various user input devices, such as keyboard, remote controller, and/or other non-keyboard inputs. However, content authors may not universally support user input via a mouse and/or other non-keyboard devices because supporting a pointing device such as a mouse may entail the handling of complex mouse events.

SUMMARY

Included are embodiments for translating user input in a high definition video playback system. At least one embodiment of a method includes executing at least one user interactive program stored on a high definition optical disc, the user interactive program defining a user interface and keyboard event handlers. Some embodiments may further include encoding for display the user interface and receiving a non-keyboard user input. Embodiments may also include translating the non-keyboard user input into at least one keyboard event and handling the at least one keyboard event in at least one of the keyboard event handlers.

Also included are embodiments of a system. Some embodiments include a disc viewer configured to execute at least one user interactive program stored on a high definition optical disc, the user interactive program defining a user interface and keyboard event handlers. Some embodiments may also include a user interface renderer configured to encode for display the user interface. Some embodiments further include a non-keyboard input translator configured to receive a non-keyboard user input, where the non-keyboard input translator translates the non-keyboard user input into at least one keyboard event. Some embodiments may likewise include a keyboard event handler configured to handle the at least one keyboard event in at least one of the keyboard event handlers.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
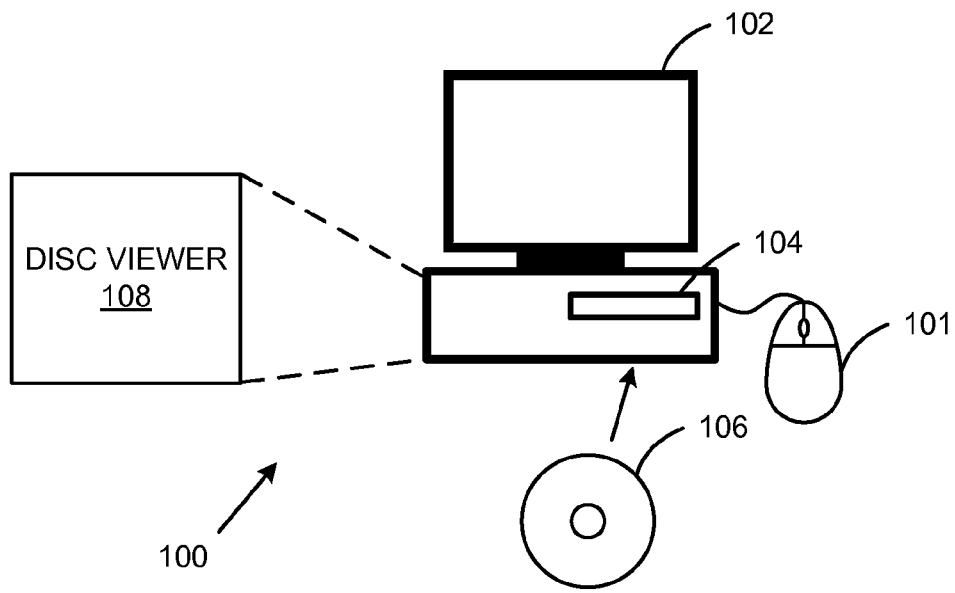
FIG. 1 depicts an exemplary embodiment of a high definition video playback system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Blu-ray Disc (BD) is one example of an optical storage media format that is employed for storage and/or playback of high definition video. In conjunction with the storage and/or playback of high definition video, a content author may provide one or more user interactive programs containing user interactive features such as menus, widgets or other user interface elements that are executable by a BD player device or BD player software. Such user interactive features allow a user to interact with software residing on a BD disc and executed by a BD player to enhance the viewing experience.

However, high definition optical media formats such as the BD format may not require a content author to provide support for various types of input devices that a user may wish to use for interacting with a user interface. As a non-limiting example, a content author may provide support in a user interactive program defining a user interface for a keyboard or remote control input device, but fail to provide support in the user interface to a mouse or pointing device. Consequently, due to a content author's failure to provide a user interactive program supporting a mouse or pointing device, a user may be unable to interact with such an exemplary user interface by using a mouse or pointing device.

Accordingly, the present disclosure provides systems and methods for allowing a user to interact with a user interface or user interactive program in a high definition video playback system used for playback of Blu-ray Discs or other high definition video sources. The disclosed systems and methods provide a high definition video playback system that can translate a non-keyboard user input into a keyboard event when conducting playback of high definition video such as that on a BD disc, or a high definition disc. Consequently, if a BD disc provides a user interactive program defining a user interface that fails to support user input via a mouse, pointing device, or other non-keyboard input device, the disclosed high definition video playback system can translate mouse, pointing device or other non-keyboard input into at least one keyboard event that can be processed by the user interface, thereby allowing a user to interact with such a user interface in additional ways other than those supported by the software residing on the BD disc.

Reference is now made to FIG. 1, which depicts an embodiment of a high definition video playback system 100. As illustrated in the non-limiting example of FIG. 1, the high definition video playback system 100 may include one or more user input devices such as a keyboard, mouse 101, and/or other pointing device. The high definition video playback system 100 may also include a display 102 and high definition disc reader 104 capable of reading and/or decoding data stored within a high definition disc 106. The high definition video playback system 100 may be any type of computer system configured to receive input from a user such as a personal computer or a laptop or a digital home television, for example.

User interactive content may be received by the high definition video playback system 100 via the high definition disc reader 104 from a high definition disc 106 that can include, but is not limited to, an optical storage medium such as a Blu-ray Disc (BD) or HD-DVD. Alternatively, the system 100 can receive user interactive content from other sources, including, but not limited to, internal mass storage, a local area network, wide area network such as the Internet, cable television service, over-the-air television service, satellite television service, or other content sources as should be appreciated. The system 100 can render or display user interactive content and high definition video sources via a disc viewer 108, which can execute and/or display to a user via the display 102 a user interface encoded therein.

The disc viewer 108 can be implemented as a software program configured to play, read and/or view a high definition disc 106 or other high definition video source according to the specifications defined by standards such as the Blu-ray Disc format specification. The disc viewer 108 can also be implemented as a software program residing in the memory, mass storage, a high definition disc 106, a network location, or other location as should be appreciated.

In operation, once a high definition disc 106 or other video source is received by the disc viewer 108, the disc viewer 108 can execute and/or render one or more user interactive programs residing on the high definition disc 106. Such a user interactive program can include, but is not limited to, a movie introductory menu or other menus and user interactive features allowing a user to enhance, configure, and/or alter the viewing experience, choose playback configuration options, select chapters to view within the high definition disc 106, in-movie user interactive features, games, or other features as should be appreciated.

Figure 2:
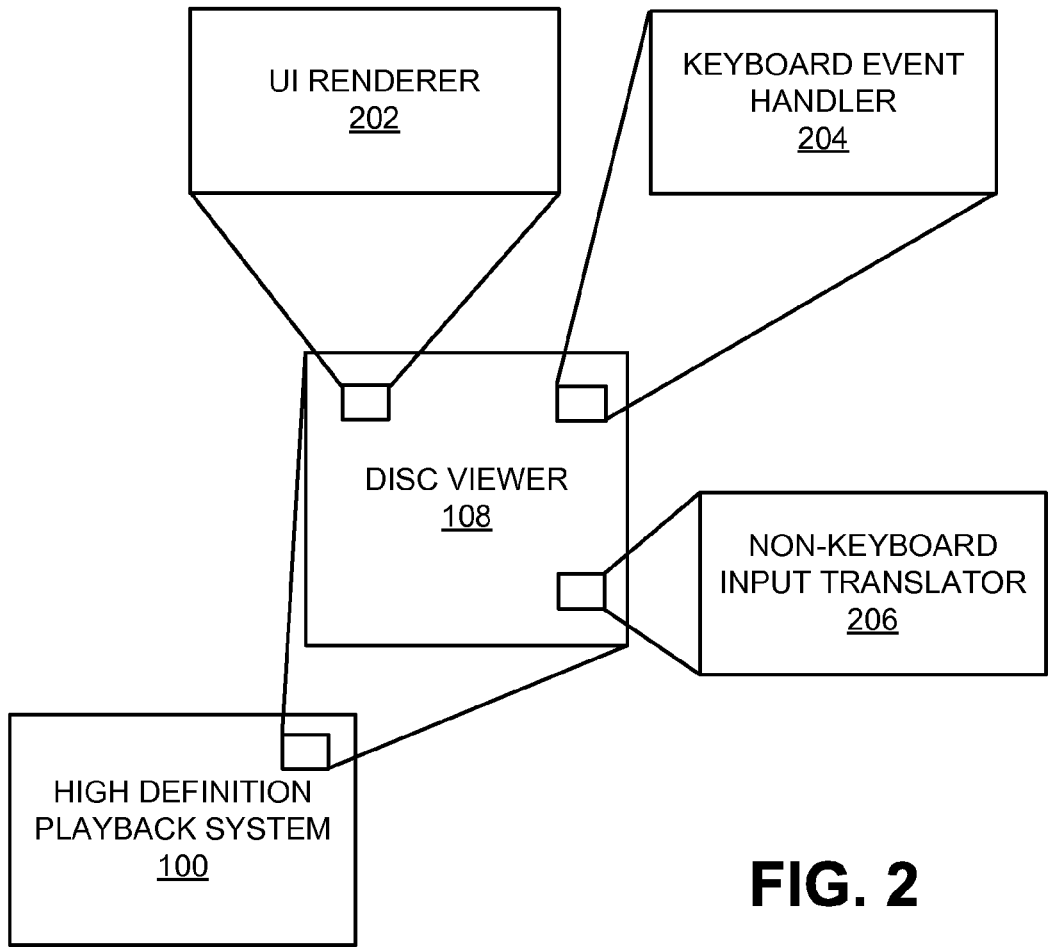
FIG. 2 depicts a functional block diagram of the high definition video playback system of FIG. 1.

Reference is now made to FIG. 2, which depicts a functional block diagram of a high definition video playback system 100 and an exemplary embodiment of a disc viewer 108. It should be noted that some components not essential for understanding (by persons skilled in the art) of the high definition video playback system 100 and/or disc viewer 108 are omitted for purposes of brevity and ease of depiction. As noted above, a disc viewer 108 can be implemented as a software program that is but one component of a high definition video playback system 100.

The disc viewer 108 can include a user interface (UI) renderer 202, which can render a user interface defined by a user interactive program residing within a video source such as a high definition disc 106 or BD disc. Such a user interface created by a content author for a high definition disc can instruct the disc viewer 108 how to display user interface elements to a user via a display or other means as well as how to handle user input from a user. For example, a user interface defined by a user interactive program can instruct the disc viewer 108 and UI renderer 202 to display a plurality of selectable elements, menus, images, video, and other user interface elements on a display 102. The user interface can also instruct the disc viewer 108 and UI renderer 202 how to navigate and/or select displayed selectable elements, menus, and the like in response to user input from a user.

The disc viewer 108 can also include at least one keyboard event handler 204 configured to handle keyboard input from a user. The keyboard event handler 204 can receive and process a keyboard event, which can be generated, for example, by a user's depressing of a key, and cause the disc viewer 108 and UI renderer 202 to effectuate any changes to the rendered user interface that are necessary due to the user input. As a non-limiting example, in a rendered user interface containing selectable user interface elements where the currently selected element is highlighted, the keyboard event handler 204 can process a keyboard event that is triggered and corresponds to a user's depressing of an up, down, left, and/or right arrow on a keyboard and cause the UI renderer 202 to highlight a different selectable user interface element corresponding to the appropriate direction of arrow key depressed by a user. As an additional non-limiting example, the keyboard event handler 204 can detect and process a keyboard event corresponding to a user's depressing an enter key on a keyboard and cause a currently highlighted selectable element to be selected. As a result, the UI renderer 202 can render user interface elements corresponding to the user's selection.

The disc viewer 108 can also include a non-keyboard input translator 206 that is configured to translate non-keyboard input from a user. Non-keyboard input can originate from a peripheral or input device in communication with a high definition video playback system 100 that may include a pointing device that can further include, but is not limited to: a mouse, touch pad, touch screen, motion sensitive input device, gesture sensitive input device, inertial input device, gyroscopic input device, joystick, game controller, or other pointing devices. Non-keyboard input can further originate from a voice activated or other non-keyboard peripheral or user input device.

The non-keyboard input translator 206 can translate non-keyboard input to allow a user to interact with a user interactive program defining a user interface that does not support non-keyboard user input. As noted above, content authors creating content for a BD disc or other high definition video sources may not define event handlers or other systems and methods necessary to allow a user to interact with a user interface with non-keyboard user input devices. Particularly in the case of a BD disc, a content author may often fail to support any non-keyboard or non-remote-control user input. Therefore, as a non-limiting example, a user viewing content on a high definition video playback system 100 may be unable to interact with a user interface defined therein using a mouse coupled to the high definition video playback system 100 even though a user may find it logical and/or easier to use the mouse to interact with the user interface. Accordingly, the non-keyboard input translator 206 and disc viewer 108 of the high definition video playback system 100 can provide such functionality absent support in the user interface defined by a user interactive program in a high definition video source.

The above example of a non-keyboard input translator 206 implemented in a disc viewer 108 of a high definition playback system 100 is merely exemplary. As an alternative non-limiting example, the non-keyboard input translator 206 can also be implemented in a BD-J program that is executed alongside a BD-J user interactive program of a high definition disc. It should be appreciated that a user may execute BD-J code alongside and/or within a user interactive program implemented on a high definition disc. A high definition playback system 100 can execute such code and/or user interactive program. Accordingly, in an alternative embodiment, the high definition playback system 100 may add and/or execute alongside and/or within a user interactive program certain BD-J code configured to handle non-keyboard input and generate appropriate keyboard events such that non-keyboard input can be supported as noted above. Therefore, while the non-keyboard input translator 206 and other components of the systems and methods disclosed herein are primarily discussed with reference to an implementation within a disc viewer 108, it should be appreciated that such functionality can be implemented in BD-J or other disc format specific code that is separate from the disc viewer 108.

Figure 3:
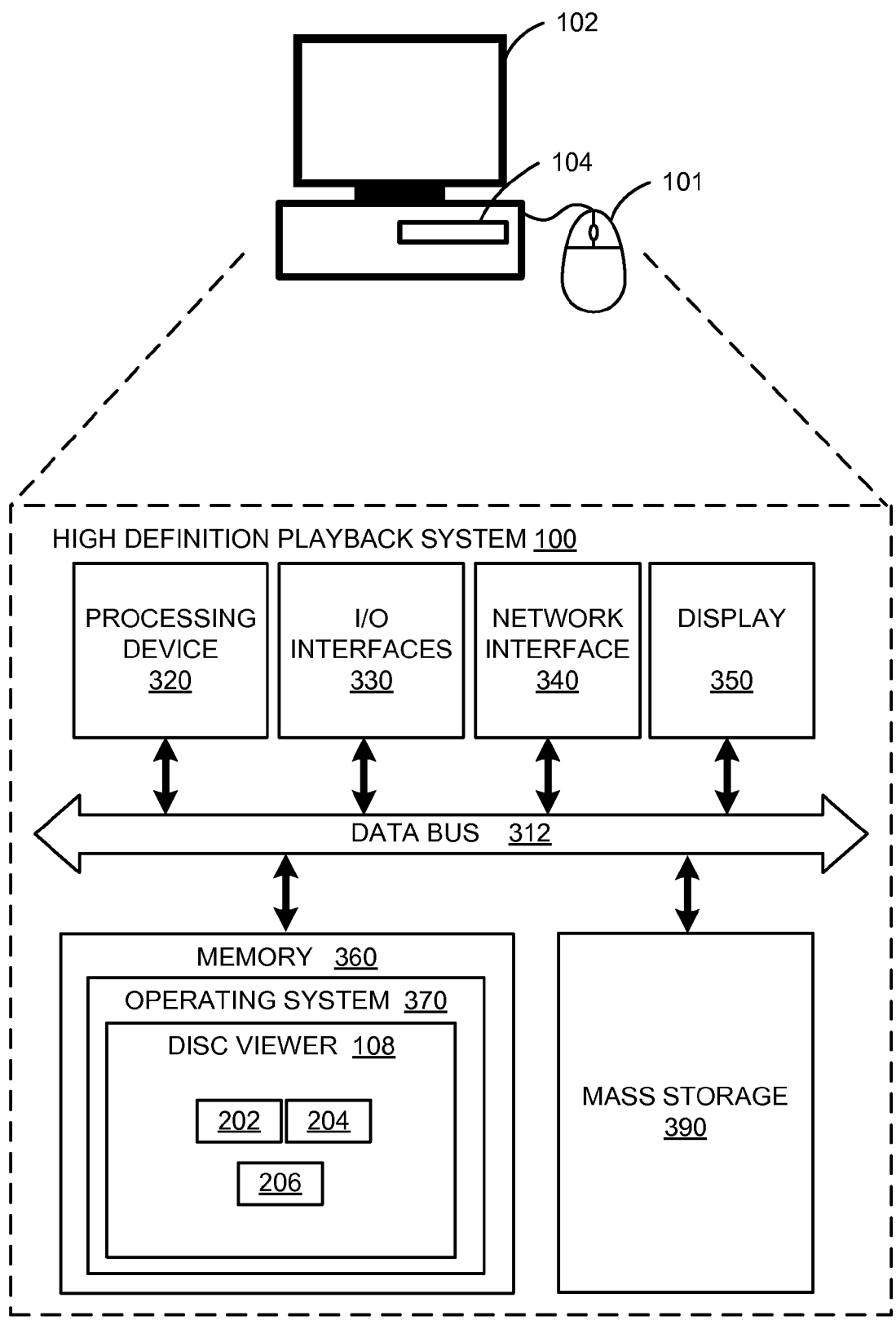
FIG. 3 depicts an alternative illustration of the high definition video playback system of FIG. 1.

Reference is now made to FIG. 3, which is an exemplary embodiment of the high definition video playback system 100 from FIG. 1. For some embodiments, the high definition video playback system 100 may be incorporated as some type of computing device. Generally speaking, the high definition video playback system 100 may be any one of a wide variety of wired and/or wireless computing devices, such as a desktop computer, portable computer, dedicated server computer, multiprocessor computing device and so forth. Irrespective of its specific arrangement, the high definition video playback system 100 may comprise, among other components, a processing device 320, input/output interfaces 320, a network interface 340, and a display 102 connected across a data bus 312. One of ordinary skill in the art will appreciate that the high definition video playback system 100 can, and typically will, comprise other components, which have been omitted for purposes of brevity.

The display 102 can comprise a computer monitor or a plasma screen for a PC or a liquid crystal display (LCD), for example. The processing device 320 can include a custom-made or commercially available processor, a central processing unit (CPU) or an auxiliary processor among several processors associated with the video viewing device 310, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 360 shown in FIG. 3 can include any one of a combination of volatile memory elements (e.g., random-access memory RAM, such as DRAM, and SRAM, etc.) and nonvolatile memory elements (e.g., ROM, hard drive, tape, CDROM, etc.). The memory 360 may store a native operating system 370, one or more native applications, emulation systems, or emulated applications for any of a variety of operating systems and/or emulated hardware platforms, emulated operating systems, etc. For example, the applications may include the disc viewer 108. Again, one of ordinary skill in the art will appreciate that the memory 360 can, and typically will, comprise other components, which have been omitted for purposes of brevity. The high definition video playback system 100 may further comprise mass storage 390. The mass storage 390 may be, for example, a disk drive, flash memory, or any other of a wide variety of storage devices capable of storing data.

The disc viewer 108 shown in FIG. 2 may be a high definition video software player application used for playing various disc formats such as HD-DVD, Blu-ray discs, as well as video retrieved from mass storage 390. As noted in FIG. 2, the disc viewer 108 may include a UI renderer 202, a keyboard event handler 204, and a non-keyboard input translator 206. When the disc viewer 108 is implemented in software, it should be noted that the application can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Input/output interfaces 330 comprise any number of interfaces for the input and output of data. For example, where the high definition video playback system 100 comprises a personal computer, the components within the system may interface with a user input device such as a keyboard, a mouse, or a remote controller. The high definition video playback system 100 may also include a network interface 340 for transmitting and/or receiving data over a network such as video content. As a non-limiting example, the network interface 340 may include a modulator/demodulator (e.g., a modem), wireless (e.g., radio frequency (RF)) transceiver, a telephonic interface, a bridge, a router, network card, etc.

Figure 4A:
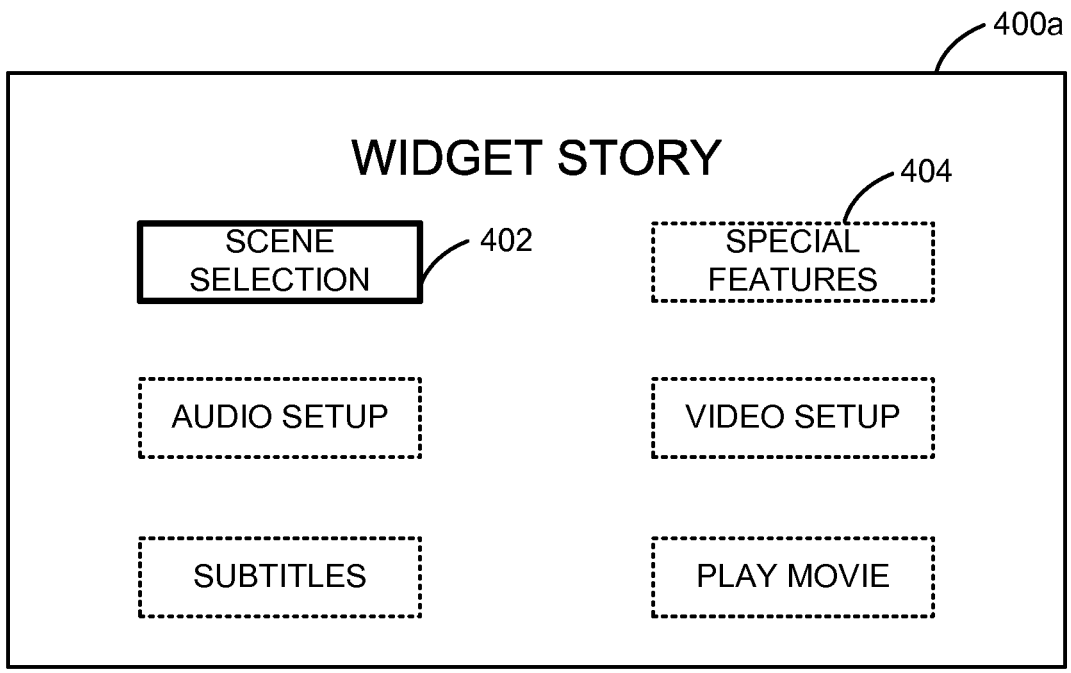
FIG. 4A depicts an exemplary user interface defined by a user interactive program in a high definition video playback system.
Figure 4B:
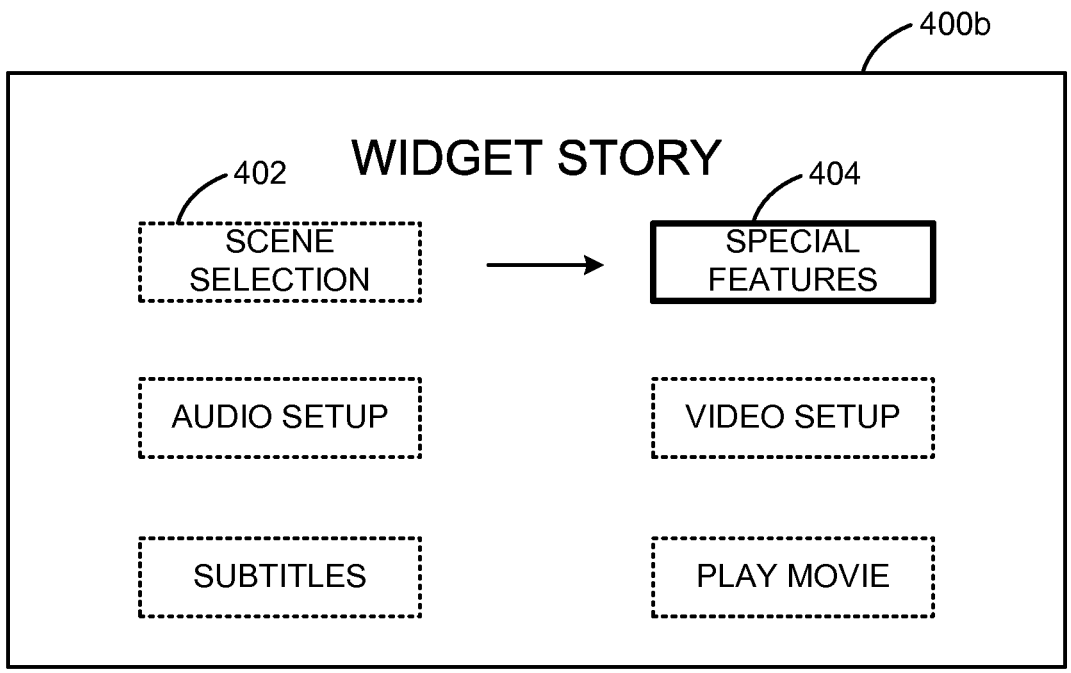
FIG. 4B depicts an alternative illustration of the exemplary user interface of FIG. 4A.

Reference is now made to FIGS. 4A and 4B, which depict a non-limiting exemplary user interface 400*a*, 400*b* that can be defined by a user interactive program on a high definition disc such as a BD disc. The depicted user interface can be rendered by the high definition video playback system 100 of FIGS. 1-3. More specifically, the UI renderer 202 (FIG. 2) of the disc viewer 108 (FIG. 1) can render the depicted user interface 400 to a display device for viewing by a user. In the depicted user interface 400, there are a number of user interface elements, such as scene element 402 and features element 404. The depicted exemplary elements 402, 404 are selectable, which should be appreciated to mean that they can be selected by a user to cause further interaction with a user interactive program of a high definition disc.

A user may interact with the user interface rendered by the UI renderer 202 by manipulating or depressing keys on a keyboard. A content author can define how the keyboard event handler 204 of a disc viewer 108 should handle keyboard events corresponding to a user's depressing keys on a keyboard. In the depicted user interface of FIG. 4A, scene element 402 is highlighted as the presently selected selectable element displayed to a user. As a non-limiting example, a user can select the highlighted scene element 402 by depressing an enter key. It should be appreciated that the user interface 400*a* defined by a user interactive program can define various responses to any key on a keyboard. As a non-limiting example, a user interactive program can define that scene element 402 can be selected by a user by depressing an 'x' key, or any key on the keyboard.

In the depicted user interface 400*b*, displayed is a result of the keyboard event handler 204 handling a keyboard event corresponding to a user's depressing a right arrow on a keyboard. In the depicted example, the keyboard event handler 204 has instructed the UI renderer 202 of the disc viewer 108 to render features element 404 with a highlighted border, thereby making features element 404 the presently selected user interface element. It should be appreciated that the above example discussed in reference to FIGS. 4A and 4B is merely exemplary and the various permutations of user interfaces and user interface elements can be defined by a high definition disc and rendered by a disc viewer 108 of a high definition video playback system 100.

Figure 5:
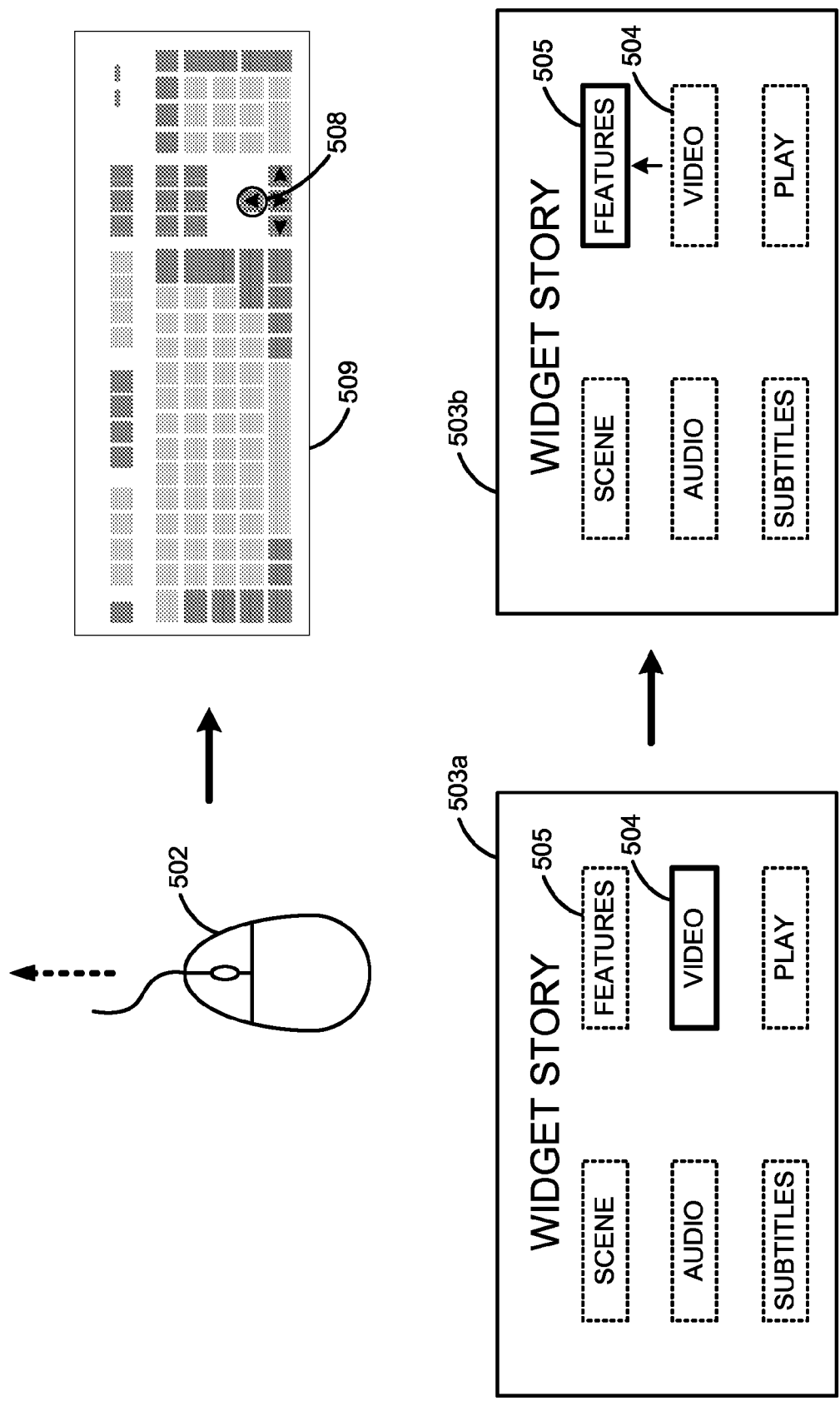
FIG. 5 depicts operation of a disc viewer in accordance with a high definition video playback system.

Reference is now made to FIG. 5, which depicts operation of the non-keyboard input translator 206 (FIG. 1). As noted above, a content author of high definition video content such as a BD disc may define a user interactive program that defines a user interface. However, content authors may not provide support for non-keyboard input devices that may be used in conjunction with a high definition video playback system 100 because support for one or more non-keyboard input features may be complicated for content authors to implement and/or may not be a mandatory feature of a high definition disc specification such as Blu-ray Disc. Accordingly, FIG. 5 depicts how a high definition video playback system 100 can provide support for non-keyboard user input that may be lacking in a high definition disc.

The depicted mouse 502 can be manipulated by a user in order to interact with the depicted non-limiting exemplary user interface 503*a*. As depicted, the mouse 502 can be manipulated in an upwards direction to cause a corresponding pointing device input vector to be generated within a high definition video playback system 100. If a content author has failed to provide support to non-keyboard user input, such a pointing device input vector may have no effect on the depicted user interface 503*a*. Therefore, the non-keyboard input translator 206 of the disc viewer 108 (FIG. 1) can translate such a pointing device input vector into a keyboard event that can be handled by the keyboard event handler 204 (FIG. 1) of the disc viewer 108, which can be defined by a content author in a user interactive program of a high definition disc.

As a result, in the depicted example, the non-keyboard input translator 206 can translate a pointing device input vector generated by the depicted mouse 502 movement into a keyboard event corresponding to a user's depressing an up arrow 508 on a keyboard 509. The keyboard event handler 204 can cause the UI renderer 202 of the disc viewer 108 to render user interface 503*b* to replace user interface 503*a*. In the depicted user interface 503*b*, features element 505 appears highlighted in response to a user's movement of the mouse 502 in an upwards direction, thereby generating an upwards pointing device input vector.

It should be appreciated that movement of a mouse 502 in downwards, leftwards, and rightwards directions can also generate corresponding downwards, leftwards, and rightwards pointing device input vectors. Accordingly, the non-keyboard input translator 206 can also generate keyboard events corresponding to a user's depression of a down arrow, left arrow, and right arrow in response to such pointing device input vectors. Additionally, the pressing of one or more buttons on the mouse 502 can be translated by the non-keyboard input translator 206 into a keyboard event corresponding to a user's depressing an enter key on a keyboard.

The sensitivity of the non-keyboard input translator 206 can also be adjusted by specifying a pointing device input vector magnitude threshold. If a pointing device input vector generated by movement of a mouse 502 has a magnitude that is less than a specified threshold in a specified time window, the non-keyboard input translator 206 can ignore such input vector and bypass generating a keyboard event for handling by the keyboard event handler 204. As a non-limiting example, the non-keyboard input translator 206 can ignore input vectors that have a magnitude of less than one hundred pixels in a two second time window, and generate one or more keyboard events only for input vectors exceeding this threshold. In this way, the non-keyboard input translator 206 can be tuned to ignore extraneous and/or accidental mouse movements that do not correspond to a forceful and/or deliberate mouse movement in a given direction.

Figure 6:
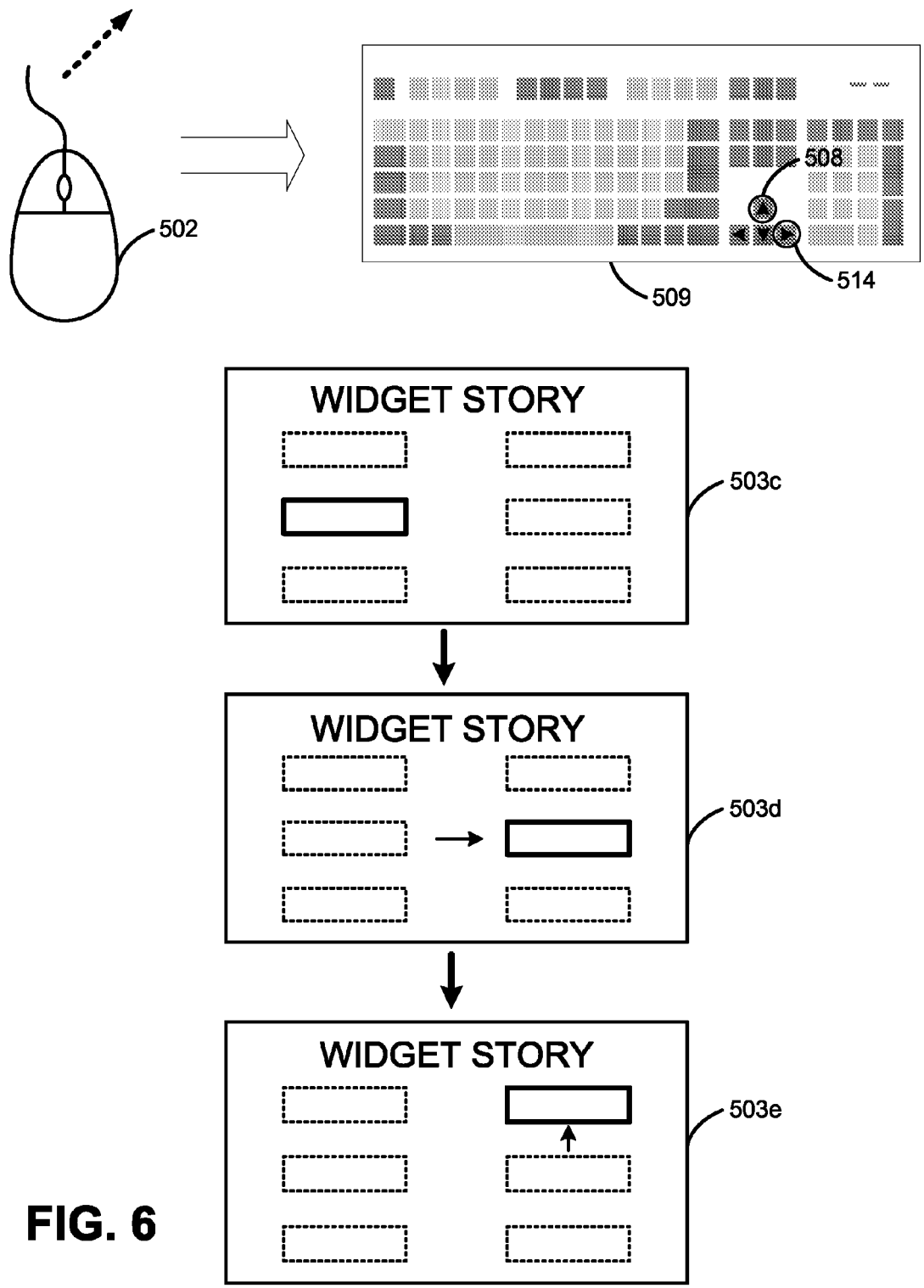
FIG. 6 depicts an alternative illustration of operation of a disc viewer in accordance with a high definition video playback system.

Reference is now made to FIG. 6, which depicts an alternative non-limiting example of the operation of a non-keyboard input translator 206 of a disc viewer 108. In the depicted example, the mouse 502 is moved substantially simultaneously in an upwards and a rightwards direction. Accordingly, a pointing device input vector in a diagonal direction can be generated in the high definition video playback system 100 in response. Alternatively, a plurality of pointing device input vectors can be generated: one in an upwards direction and one in a rightwards direction. In response, the non-keyboard input translator 206 can generate a plurality of keyboard events for handling by a keyboard event handler 204 defined by a user interface of a high definition disc. Therefore, in the depicted example, a keyboard event corresponding to depressing of an up arrow 508 and a right arrow 514 on a keyboard 509 can be generated, which is analogous to a mouse movement in the depicted diagonal direction.

The depicted user interfaces 503*c*, 503*d*, 503*e* depict rendering of a user interface by the UI renderer 202 in response to the plurality of keyboard events generated in response to the depicted diagonal movement of the mouse 502. In user interface 503*d*, 503*e*, keyboard events corresponding to depression of a right arrow and an up arrow are generated, so the keyboard event handler 204 instructs the UI renderer 202 to render user interface 503*d*, which depicts a user interface subsequent to event handling and rendering of a user interface in connection with a right arrow keyboard event. User interface 503*e* depicts a user interface subsequent to event handling and rendering of a user interface in connection with an up arrow keyboard event.

Figure 7:
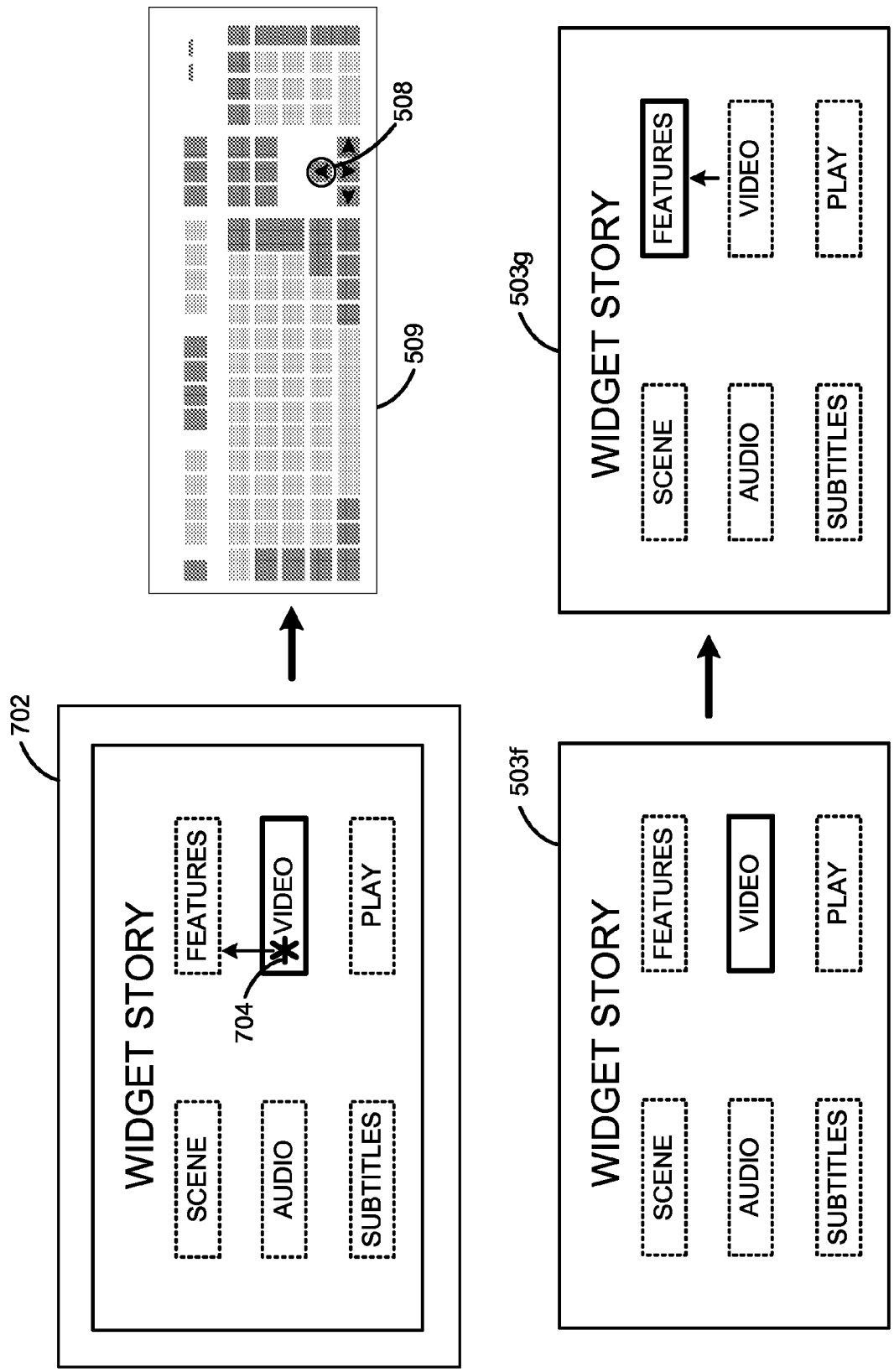
FIG. 7 depicts an alternative illustration of operation of a disc viewer in accordance with a high definition video playback system.

Reference is now made to FIG. 7, which depicts yet another alternative non-limiting example of the operation of a non-keyboard input translator 206 of a disc viewer 108. In the depicted example, a touch screen input device 702 is to receive user input for manipulating and/or navigating a user interface defined by a user interactive program of a high definition disc. As a non-limiting example, a user using a touch-panel input device may activate or "select" the depicted user interface elements, as the non-keyboard input translator 206 can translate such input to a keyboard event corresponding to selection of the user interface elements. In addition, in the depicted non-limiting example, a user may also touch and drag the video element 704 towards the depicted features element on the touch screen input device 702 to generate a pointing device input vector in the high definition video playback system 100.

In the depicted example, a pointing device input vector in an upwards direction can be generated according to such dragging movement on the touch screen input device 702 and/or touch panel, and the non-keyboard input translator 206 can generate a keyboard event corresponding to depressing of an up arrow 508 on a keyboard 509. As a result, the keyboard event handler 204 defined by a user interactive program on a high definition disc can handle the keyboard event by causing the UI renderer 202 to alter user interface 503f and render user interface 503g. Additionally, the non-keyboard input translator 206 can also generate a keyboard event corresponding to an enter key or other key in response to touch screen user input corresponding to a selection. As a result, a user may interact via a touch screen with a user interactive program on high definition disc such as a BD disc even if a content author fails to provide support for a touch screen pointing device 702.

Figure 8A:
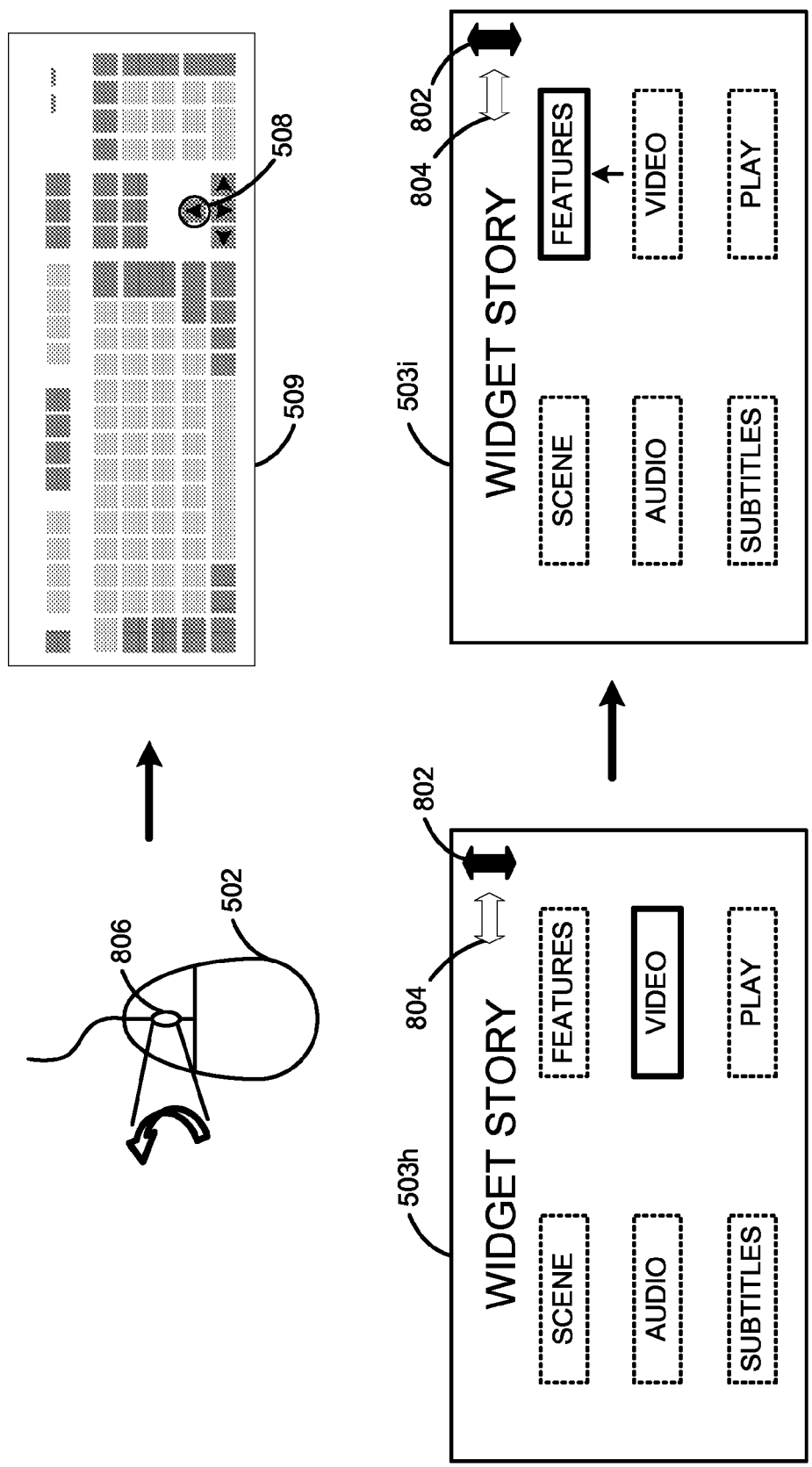
FIG. 8A depicts an alternative illustration of operation of a disc viewer in accordance with a high definition video playback system.
Figure 8B:
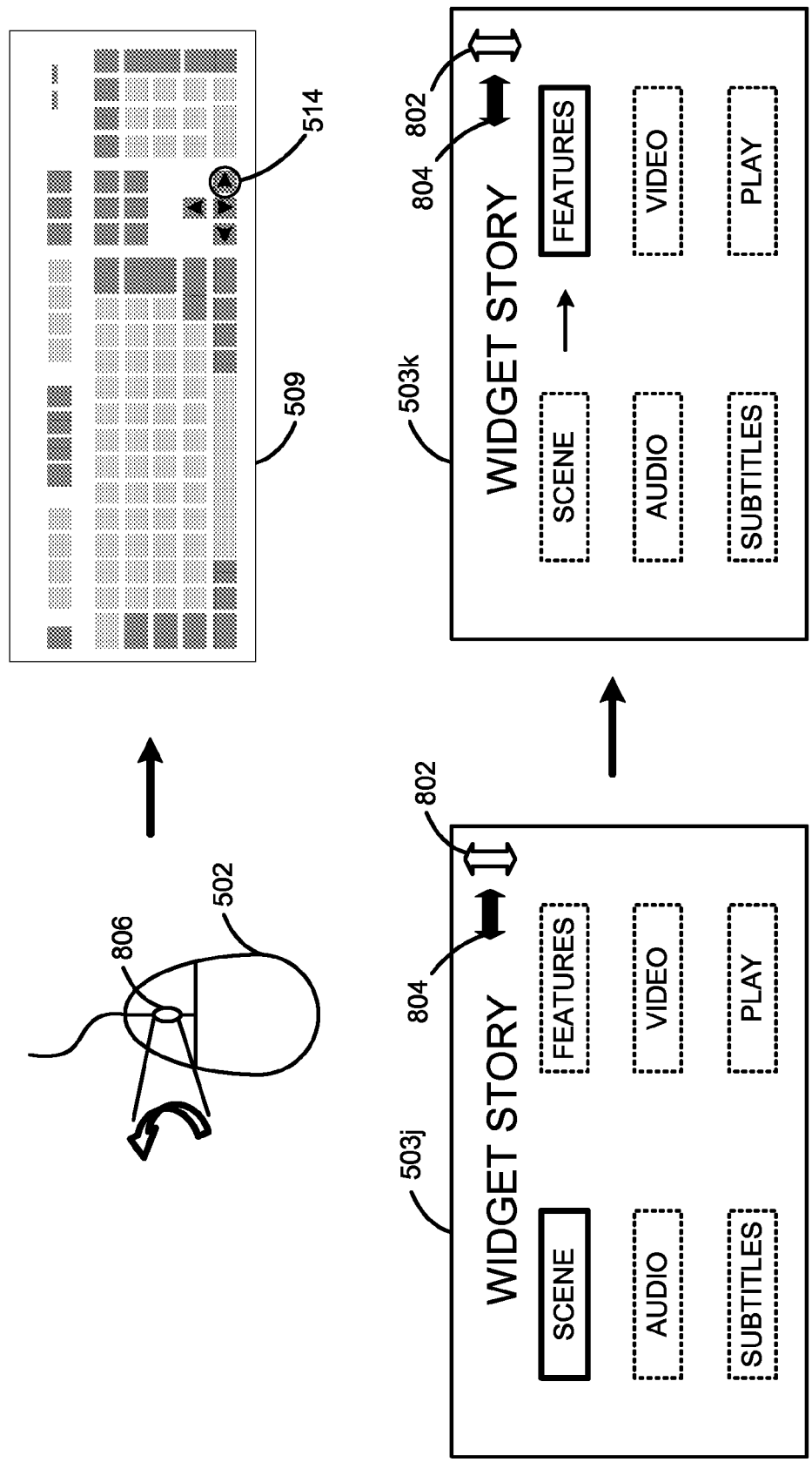
FIG. 8B depicts an alternative illustration of operation of a disc viewer in accordance with a high definition video playback system.

Reference is now made to FIGS. 8A and 8B, which depict yet another alternative non-limiting example of the operation of a non-keyboard input translator 206 of a disc viewer 108. In the depicted example, a mouse 502 is employed to allow a user to interact with a user interface defined by a user interactive program on a high definition disc. A directional selector comprising a vertical axis selector 802 and horizontal axis selector 804 is overlaid on a user interface 503h defined by a user interactive program by the UI renderer 202 of the disc viewer 108. The depicted directional selector can allow a user to manipulate a scroll wheel 806 or other scrolling device in order to navigate or interact with the user interface 503h. As a non-limiting example, a user can use the mouse 502 to select one of the orthogonal axes displayed by the vertical axis selector 802 and the horizontal axis selector 804. Upon selection of one of the vertical axis selector 802 or the horizontal axis selector 804, manipulation of the scroll wheel 806 can cause the non-keyboard input translator 206 to generate keyboard events in a direction along the selected axis.

As a non-limiting example, in the depicted user interface 503h, the vertical axis selector 802 is selected, for example, by touching the vertical axis selector 802. Accordingly, manipulation of the scroll wheel 806 causes the non-keyboard input translator to generate keyboard events corresponding to depressing an up arrow or a down arrow. In the depicted example, manipulation of the scroll wheel 806 causing a directional input vector in a first direction further causes the non-keyboard input translator 206 to generate a keyboard event corresponding to depressing an up arrow 508 on a keyboard 509. Manipulation of the scroll wheel 806 in an opposite direction causes the non-keyboard input translator 206 to generate a keyboard event corresponding to depressing a down arrow on a keyboard 509. As a result, the keyboard event handler 204 can instruct the UI renderer 202 to render user interface 503i for display to a user viewing a high definition disc in a high definition video playback system 100. Additionally, the non-keyboard input translator 206 can generate a keyboard event corresponding to depressing an enter key if a user depresses the scroll wheel 806.

As an alternative non-limiting example, FIG. 8B depicts a user interface 503j that illustrates an example of a user interface with a horizontal axis selector 804 that is chosen by a user, for example, by touching the horizontal axis selector 804. Manipulation of a scroll wheel 806 on a mouse 502 causes the non-keyboard input translator 206 to generate a keyboard event corresponding to depressing a directional key on a keyboard 509 in a horizontal axis. In the depicted example, manipulation of the scroll wheel 806 causes the non-keyboard input translator 206 to generate a keyboard event corresponding to depressing a right arrow 514 on a keyboard 509. Manipulation of the scroll wheel 806 in the opposite direction causes the non-keyboard input translator 206 to generate a keyboard event corresponding to the left arrow on a keyboard 509. As a result, the keyboard event handler 204 can instruct the UI renderer 202 to render user interface 503k.

Figure 9:
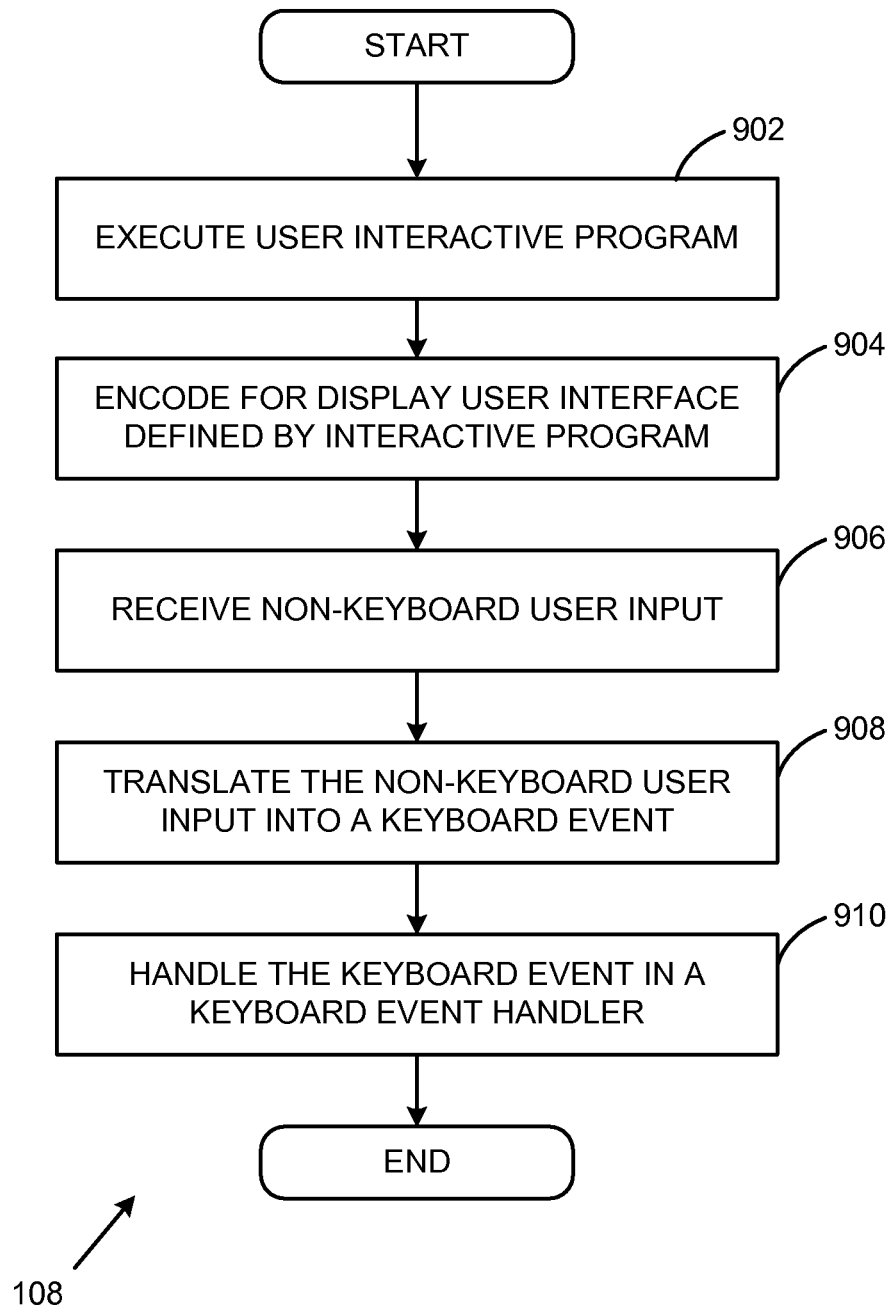
FIG. 9 depicts a flowchart illustrating operation of a disc viewer in accordance with the disclosure.

Reference is now made to FIG. 9, which depicts one example of the execution of the disc viewer 108. The flow chart may also be viewed as depicting a method in accordance with the disclosure. First, in box 902, the disc viewer 108 can execute a user interactive program such as a BD-J program on a high definition disc such as a BD disc or other high definition video source that defines a user interface. In box 904, the disc viewer 108 can encode for display the user interface that is defined by the user interactive program. In box 906, the disc viewer 108 can receive pointing device or non-keyboard user input from a user. As noted above, a user may wish or attempt to interact with a user interface defined by a high definition disc with a non-keyboard input device even though the user interactive program defining the user interface may fail to support non-keyboard user input.

In box 908, the disc viewer 108 can translate the non-keyboard user input into a keyboard event corresponding to the non-keyboard user input. As noted above, if a user moves a mouse or other pointing device in a direction, such non-keyboard or pointing device input can be translated into one or more keyboard events in corresponding directions. Then, in box 910, the disc viewer 108 handles the keyboard event as defined by the user interface of the user interactive program that is triggered from a user's non-keyboard user input.

Figure 10:
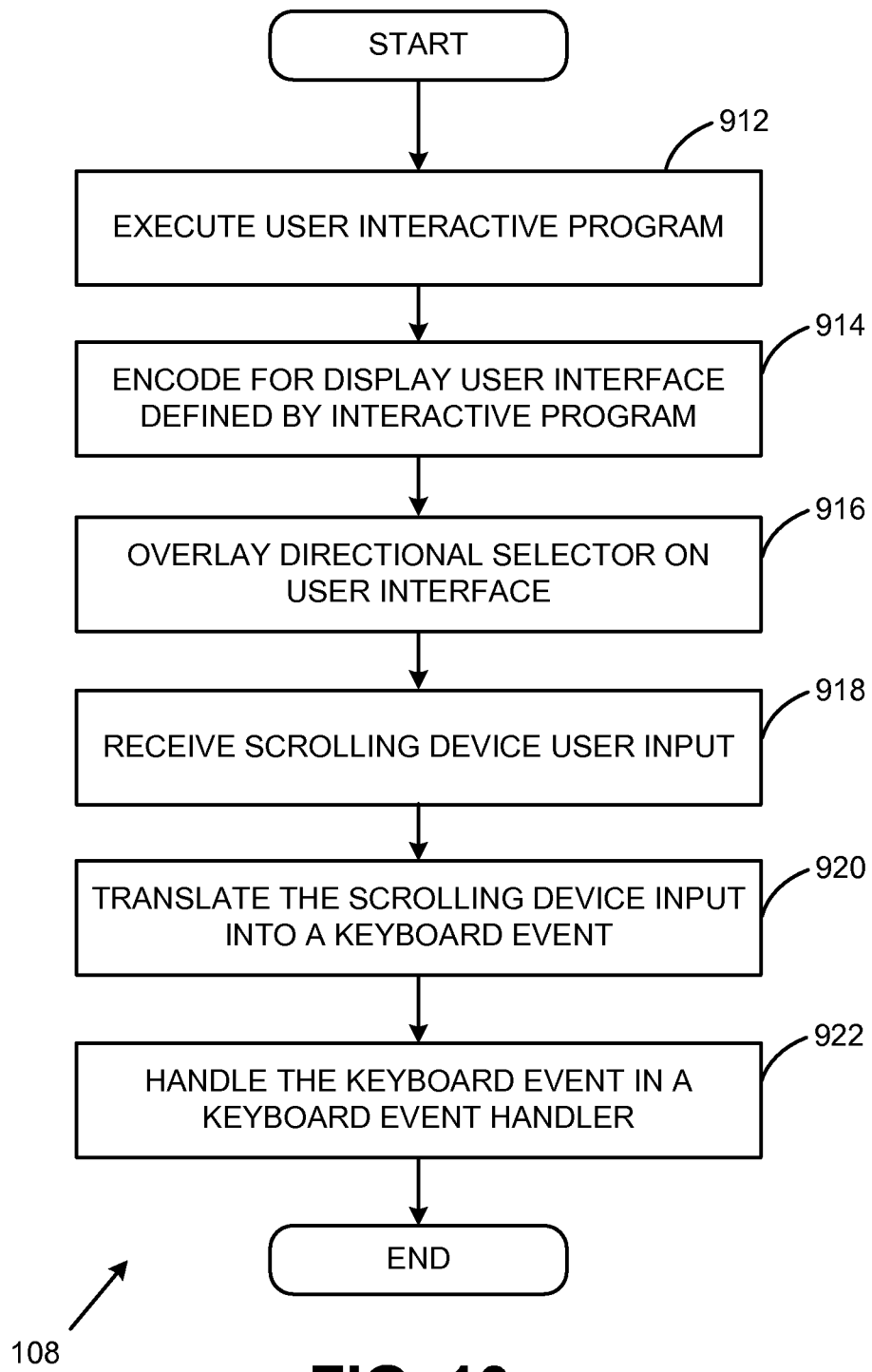
FIG. 10 depicts a flowchart illustrating operation of a disc viewer in accordance with the disclosure.

Reference is now made to FIG. 10, which depicts an alternative example of the execution of the disc viewer 108. The flow chart may also be viewed as depicting a method in accordance with the disclosure. In box 912, the disc viewer 108 can execute a user interactive program on a high definition disc such as a BD disc or other high definition video source that defines a user interface. Similar to the above FIG. 9, in box 914, the disc viewer 108 can encode for display the user interface that is defined by the user interactive program. In box 916, the disc viewer 108 can overlay a directional selector on the user interface. As noted above, the directional selector can allow a user to select an axis along which manipulation of a scrolling device on a mouse or other pointing device can cause directional keyboard events to be generated. In box 918, the disc viewer 108 can receive scrolling device input from a user generated by a user's manipulation of a scrolling device or scroll wheel. As noted above, a user may wish or attempt to interact with a user interface defined by a high definition disc with a non-keyboard input device such as a mouse even though the user interactive program defining the user interface may fail to support non-keyboard user input.

In box 920, the disc viewer 108 can translate the scrolling device input into a keyboard event corresponding to the scrolling device input. As noted above, if a user manipulates a scrolling device in a direction, such manipulation can be translated into one or more keyboard events in corresponding directions. Then, in box 922, the disc viewer 108 handles the keyboard event as defined by the user interface of the user interactive program that is triggered from a user's manipulation of a scrolling device.

Although the functionality of various components are described above with respect to FIGS. 1-8B as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally appreciated by those skilled in the art and, consequently, are not described in detail herein.

The flow charts of FIGS. 9-10 show the functionality and operation of an implementation of the high definition video playback system 100 and systems therein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIG. 9-10 show a specific order of execution, it is understood that the order of execution may differ from that which is depicted. For example, the order of execution of two or more blocks may be scrambled relative to the order shown. Also, two or more blocks shown in succession in FIGS. 9-10 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method for translating user input in a high definition video playback system, comprising the steps of:
    executing at least one user interactive program stored on a high definition optical disc, the user interactive program defining a user interface and a plurality of keyboard event handlers for interaction with the user interface, wherein the user interface defines a plurality of user interface elements for a user to select;
    encoding for display the user interface elements of the user interface;
    receiving a non-keyboard user input including a pointing device input vector indicating a direction in response to movement by a pointing device, wherein the pointing device input vector corresponds to at least one of: an upwards direction, a downwards direction, a leftward direction, and a rightward direction;
    translating the non-keyboard user input originating from the pointing device into at least one keyboard event corresponding to the direction, wherein the keyboard event corresponds to depression of at least one of: an up key corresponding to upward movement by the pointing device, a down key corresponding to downward movement by the pointing device, a left key corresponding to leftward movement by the pointing device, and a right key corresponding to rightward movement by the pointing device; and
    handling the at least one keyboard event in at least one of the keyboard event handlers.

2. The method of claim 1, wherein the pointing device input vector is generated from a pointing device that is at least one of: a mouse pointing device, a touch pad pointing device, a touch screen input device, motion sensitive input device, an inertial input device, a gyroscopic input device, a joystick, a game controller, or a voice activated input device.

3. The method of claim 1, wherein the step of translating the non-keyboard user input further comprises triggering the at least one keyboard event if the pointing device input vector exceeds a specified threshold.

4. The method of claim 1, wherein the non-keyboard user input corresponds to depressing at least one button on the pointing device, and the keyboard event corresponds to depression of an enter key.

5. The method of claim 2, wherein the pointing device input vector is a directional input vector generated by manipulation of a scrolling device on the pointing device, the directional input vector being at least one of: an upwards direction and a downwards direction.

6. The method of claim 5, further comprising the step of:
    encoding for display a directional selector overlaid on the user interface, wherein the directional selector allows a user to select one of a plurality of orthogonal axes along which manipulation of the scrolling device causes the at least one keyboard event to be generated, the directional selector further displaying the selected one of the plurality of axes.

7. The method of claim 6, wherein:
    the directional selector allows the user to select a vertical axis, the vertical axis allowing manipulation of the scrolling device to cause the at least one keyboard event to correspond to depression of at least one of: an up key and a down key; and
    depression of the scrolling device causes the at least one keyboard event to correspond to depression of an enter key.

8. The method of claim 6, wherein:
the directional selector allows the user to select a horizontal axis, the horizontal axis allowing manipulation of the scrolling device to cause the at least one keyboard event to correspond to depression of at least one of: an left key and a right key; and
depression of the scrolling device causes the at least one keyboard event to correspond to depression of an enter key.

9. A system for translating user input in a high definition video playback system, comprising:
a disc viewer configured to execute at least one user interactive program stored on a high definition optical disc, the user interactive program defining a user interface and a plurality of keyboard event handlers for interaction with the user interface wherein the user interface defines a plurality of user interface elements for a user to select;
a user interface renderer configured to encode for display the user interface elements of the user interface;
a non-keyboard input translator configured to receive a non-keyboard user input including a pointing device input vector indicating a direction in response to movement by a pointing device, wherein the pointing device input vector corresponds to at least one of: an upwards direction, a downwards direction, a leftward direction, and a rightward direction, wherein the non-keyboard input translator translates the non-keyboard user input originating from the pointing device into at least one keyboard event corresponding to the direction, wherein the keyboard event corresponds to depression of at least one of: an up key corresponding to upward movement by the pointing device, a down key corresponding to downward movement by the pointing device, a left key corresponding to leftward movement by the pointing device, and a right key corresponding to rightward movement by the pointing device; and
a keyboard event handler configured to handle the at least one keyboard event in at least one of the keyboard event handlers.

10. The system of claim 9, wherein the pointing device input vector is generated from a pointing device that is at least one of: a mouse pointing device, a touch pad pointing device, a touch screen input device, motion sensitive input device, an inertial input device, a gyroscopic input device, a joystick, a game controller, or a voice activated input device.

11. The system of claim 9, wherein the non-keyboard input translator further comprises a specified threshold, and wherein the non-keyboard input translator translates the non-keyboard user input into the at least one keyboard event if the pointing device input vector exceeds the specified threshold.

12. The system of claim 9, wherein the non-keyboard user input corresponds to depressing at least one button on the pointing device, and the keyboard event corresponds to depression of an enter key.

13. The system of claim 10, wherein the pointing device input vector is a directional input vector generated by manipulation of a scrolling device on the pointing device, the directional input vector being at least one of: an upwards direction and a downwards direction.

14. The system of claim 13, wherein:
the user interface renderer is configured to encode for display a directional selector overlaid on the user interface, wherein the directional selector allows a user to select one of a plurality of orthogonal axes along which manipulation of the scrolling device causes the at least one keyboard event to be generated, the directional selector further displaying the selected one of the plurality of axes.

15. The system of claim 14, wherein:
the directional selector allows the user to select a vertical axis, the vertical axis allowing manipulation of the scrolling device to cause the at least one keyboard event to correspond to depression of at least one of: an up key and a down key; and
depression of the scrolling device causes the at least one keyboard event to correspond to depression of an enter key.

16. The system of claim 14, wherein:
the directional selector allows the user to select a horizontal axis, the horizontal axis allowing manipulation of the scrolling device to cause the at least one keyboard event to correspond to depression of at least one of: an left key and a right key; and
depression of the scrolling device causes the at least one keyboard event to correspond to depression of an enter key.

17. A non-transitory computer-readable medium having a computer program for translating user input in a high definition video playback system, comprising:
logic for executing at least one user interactive program stored on a high definition optical disc, the user interactive program defining a user interface and a plurality of keyboard event handlers for interaction with the user interface, wherein the user interface defines a plurality of user interface elements for a user to select;
logic for encoding for display the user interface elements of the user interface;
logic for receiving a non-keyboard user input including a pointing device input vector indicating a direction in response to movement by a pointing device, wherein the pointing device input vector corresponds to at least one of: an upwards direction, a downwards direction, a leftward direction, and a rightward direction;
logic for translating the non-keyboard user input originating from the pointing device into at least one keyboard event corresponding to the direction, wherein the keyboard event corresponds to depression of at least one of: an up key corresponding to upward movement by the pointing device, a down key corresponding to downward movement by the pointing device, a left key corresponding to leftward movement by the pointing device, and a right key corresponding to rightward movement by the pointing device; and
logic for handling the at least one keyboard event in at least one of the keyboard event handlers.

18. The non-transitory computer-readable medium of claim 17, wherein the pointing device input vector is generated from a pointing device that is at least one of: a mouse pointing device, a touch pad pointing device, a touch screen input device, motion sensitive input device, an inertial input device, a gyroscopic input device, a joystick, a game controller, or a voice activated input device.

19. The non-transitory computer-readable medium of claim 17, wherein the logic for translating the non-keyboard user input further comprises logic for triggering the at least one keyboard event if the pointing device input vector exceeds a specified threshold.

20. The non-transitory computer-readable medium of claim 17, wherein the non-keyboard user input corresponds to depressing at least one button on the pointing device, and the keyboard event corresponds to depression of an enter key.

21. The non-transitory computer-readable medium of claim 18, wherein the pointing device input vector is a directional input vector generated by manipulation of a scrolling device on the pointing device, the directional input vector at least one of: an upwards direction and a downwards direction.

22. The non-transitory computer-readable medium of claim 21, further comprising the step of:
  encoding for display a directional selector overlaid on the user interface, wherein the directional selector allows a user to select one of a plurality of orthogonal axes along which manipulation of the scrolling device causes the at least one keyboard event to be generated, the directional selector further displaying the selected one of the plurality of axes.

23. The non-transitory computer-readable medium of claim 22, wherein:
  the directional selector allows the user to select a vertical axis, the vertical axis allowing manipulation of the scrolling device to cause the at least one keyboard event to correspond to depression of at least one of: an up key and a down key; and
  depression of the scrolling device causes the at least one keyboard event to correspond to depression of an enter key.

24. The non-transitory computer-readable medium of claim 22, wherein:
  the directional selector allows the user to select a horizontal axis, the horizontal axis allowing manipulation of the scrolling device to cause the at least one keyboard event to correspond to depression of at least one of: an left key and a right key; and depression of the scrolling device causes the at least one keyboard event to correspond to depression of an enter key.

* * * * *